(12) United States Patent
Udall (10) Patent No.: US 9,109,733 B2
(45) Date of Patent: Aug. 18, 2015

(54) HYDRAULIC FLUID TRANSFER COUPLING

(75) Inventor: Kenneth F. Udall, Ilkeston (GB)

(73) Assignee: ROLLS-ROYCE plc, London (GB)

( * ) Notice: Subject to any disclaimer, the term of this patent is extended or adjusted under 35 U.S.C. 154(b) by 561 days.

(21) Appl. No.: 13/636,551

(22) PCT Filed: Mar. 9, 2011

(86) PCT No.: PCT/EP2011/053525
§ 371 (c)(1),
(2), (4) Date: Sep. 21, 2012

(87) PCT Pub. No.: WO2011/120771
PCT Pub. Date: Oct. 6, 2011

(65) Prior Publication Data
US 2013/0000313 A1    Jan. 3, 2013

(51) Int. Cl.
*B64C 11/38*    (2006.01)
*F16L 39/04*    (2006.01)
*F02C 7/36*    (2006.01)
*B64C 11/30*    (2006.01)

(52) U.S. Cl.
CPC ............... *F16L 39/04* (2013.01); *B64C 11/30* (2013.01); *B64C 11/306* (2013.01); *B64C 11/38* (2013.01); *F02C 7/36* (2013.01); *F05D 2260/406* (2013.01)

(58) Field of Classification Search
CPC ..... F05D 2260/406; F02C 7/36; F16H 39/00; F16H 41/00
USPC .......................... 184/6.11; 440/50; 244/60, 69
See application file for complete search history.

(56) References Cited

U.S. PATENT DOCUMENTS

| 2,188,313 | A | * | 1/1940 | Ruths et al. | ............... | 416/157 R |
| 2,581,320 | A | * | 1/1952 | Burton et al. | ................. | 416/125 |
| 4,028,004 | A | * | 6/1977 | Wind | ......................... | 416/157 R |
| 4,635,971 | A | * | 1/1987 | Perratone et al. | .......... | 285/121.3 |

(Continued)

FOREIGN PATENT DOCUMENTS

| DE | 926 170 | 4/1955 |
| DE | 37 38 305 A1 | 5/1989 |

(Continued)

OTHER PUBLICATIONS

May 3, 2011 International Search Report issued in International Patent Application No. PCT/EP2011/053525.
May 3, 2011 Written Opinion of the International Searching Authority issued in International Patent Application No. PCT/EP2011/053525.

(Continued)

*Primary Examiner* — Phutthiwat Wongwian
*Assistant Examiner* — Marc Amar
(74) *Attorney, Agent, or Firm* — Oliff PLC (57) ABSTRACT

A hydraulic fluid transfer coupling has a stator, a first coaxial rotor, and a second coaxial rotor. The first rotor is radially inwards of the stator, the second rotor is radially outwards of the stator, at least part of the first rotor axially overlapping with the stator, and at least part of the second rotor axially overlapping with the stator. The first rotor carries one or more first rotating fluid lines, and the second rotor carries one or more second rotating fluid lines. The stator carries one or more first static fluid lines and second static fluid lines. Each pair of a first rotating fluid line and the corresponding first static fluid line are fluidly coupled and each pair of a second rotating fluid line and the corresponding second static fluid line are fluidly coupled. Hydraulic fluid is transferable between each static fluid line and the corresponding rotating fluid line.

16 Claims, 5 Drawing Sheets

(56) References Cited

U.S. PATENT DOCUMENTS

| | | | |
|---|---|---|---|
| 4,743,162 A | | 5/1988 | Pope |
| 5,186,609 A | * | 2/1993 | Inoue et al. .................. 416/129 |
| 5,529,347 A | | 6/1996 | Lee |
| 2008/0020891 A1 | * | 1/2008 | Beaven ......................... 475/332 |
| 2010/0206982 A1 | * | 8/2010 | Moore et al. ..................... 244/62 |
| 2011/0171030 A1 | * | 7/2011 | Swift et al. .................... 416/159 |
| 2011/0305575 A1 | * | 12/2011 | Balk et al. ................. 416/170 R |
| 2011/0311361 A1 | * | 12/2011 | Charier et al. ................ 416/129 |
| 2012/0288358 A1 | * | 11/2012 | Balk ......................... 415/124.1 |

FOREIGN PATENT DOCUMENTS

| | | |
|---|---|---|
| DE | 44 39 137 | 9/1996 |
| EP | 0 137 557 A1 | 4/1985 |
| GB | 2 187 526 A | 9/1987 |

OTHER PUBLICATIONS

Jun. 16, 2010 Search Report issued in British Patent Application No. GB1005442.7.

* cited by examiner

HYDRAULIC FLUID TRANSFER COUPLING

The present invention relates to a hydraulic fluid transfer coupling, for example for transferring hydraulic fluid between static and rotating structures of a gas turbine engine.

Aircraft manufactures are under continual pressure to improve the fuel efficiency of their aircraft. It is known that open rotor gas turbine engines can provide substantial efficiency benefits.

One configuration under consideration is for an open rotor "tractor" configuration in which two contra-rotating propeller assemblies are on the outside of the engine nacelle, at the front of the assembly. The propeller assemblies are axially in-line with the gas turbine engine, and are powered by the engine shaft via an epicyclic gearbox.

Figure 1:
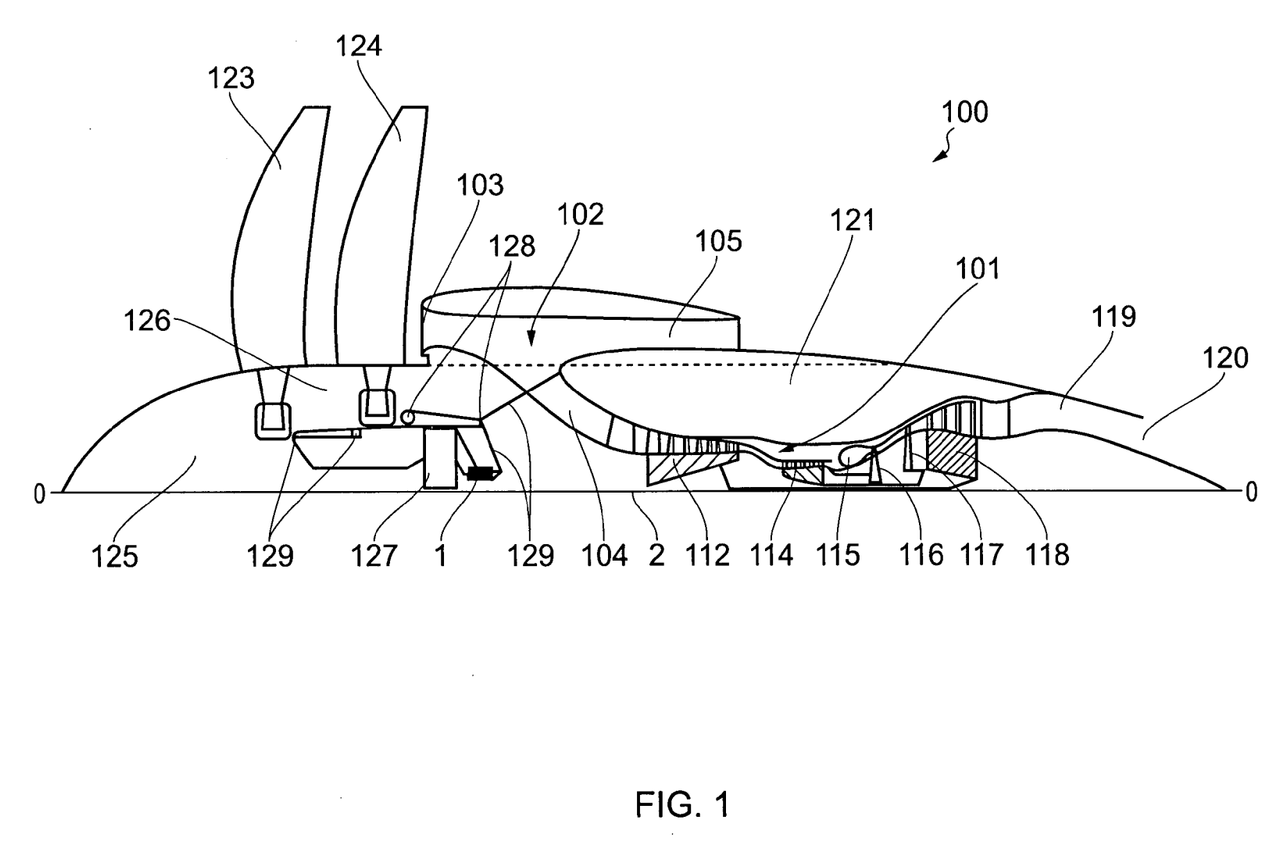
FIG. 1 shows one side of a longitudinal cross-section through a tractor, contra-rotating propeller, gas turbine engine.

With reference to FIG. 1, a tractor, contra-rotating propeller, gas turbine engine generally indicated at 100 has a principal and rotational axis O-O. The engine comprises a core engine 101 having, in axial flow series, an air intake 102, a low pressure compressor (LPC) 112, a high-pressure compressor (HPC) 114, combustion equipment 115, a high-pressure turbine (HPT) 116, a low-pressure turbine (LPT) 117, a free power turbine 118 and a core exhaust nozzle 120. A nacelle 121 generally surrounds the core engine 101 and defines a core exhaust duct 119 and the core exhaust nozzle 120. The engine 100 also comprises fore 125 and aft 126 contra-rotating blade assemblies attached to and driven by the free power turbine 118, the fore blade assembly supporting propellers 123 and the aft blade assembly supporting propellers 124. The aft propeller assembly 126 is rotatably supported by bearings 128 on a static structure 129 of the engine, while the fore propeller assembly 125 is rotatably supported by bearings 129 on the aft propeller assembly 126.

The air intake 102 comprises two intake mouths 103 at opposite sides of the engine 100, and two corresponding swan-neck ducts 104, only one of the intake mouths 103 and swan-neck ducts 104 being shown in FIG. 1. The air flow ingested by each intake mouth 103 bifurcates downstream of the mouth, a first portion of the air entering the corresponding swan-neck duct 104 and a second portion entering a bypass duct 105 which allows any debris in the ingested air to bypass the core engine 101. The two swan neck ducts 104 converge to form an annular air flow upstream of the LPC 112.

The gas turbine engine 100 works in a conventional manner so that air entering the intake 102 is accelerated by the IPC 112 and directed into the HPC 114 where further compression takes place. The compressed air exhausted from the HPC 114 is directed into the combustion equipment 115 where it is mixed with fuel and the mixture combusted. The resultant hot combustion products then expand through, and thereby drive, the HPT 116, LPT 117 and free power turbine 118 before being exhausted through the nozzle 120 to provide some propulsive thrust. The HPT 116 and LPT 117 respectively drive the HPC 114 and LPC 113 by suitable interconnecting shafts. A drive shaft 2 extends forward from the free power turbine 118 and drives the propellers 123, 124 via an epicyclic gearbox 127. The propellers 123, 124 normally provide the majority of the propulsive thrust.

This engine configuration requires hydraulic couplings to transfer hydraulic fluid from the static frame of reference (eg of a hydraulic fluid power source, such as a pump, which is typically an accessory of the core engine 101) to the clockwise and anti-clockwise rotors of the propeller assemblies 125, 126. The hydraulic fluid is needed by the propeller assemblies, for example to drive actuators which control propeller pitch, and gearbox and bearing lubrication.

Figure 2:
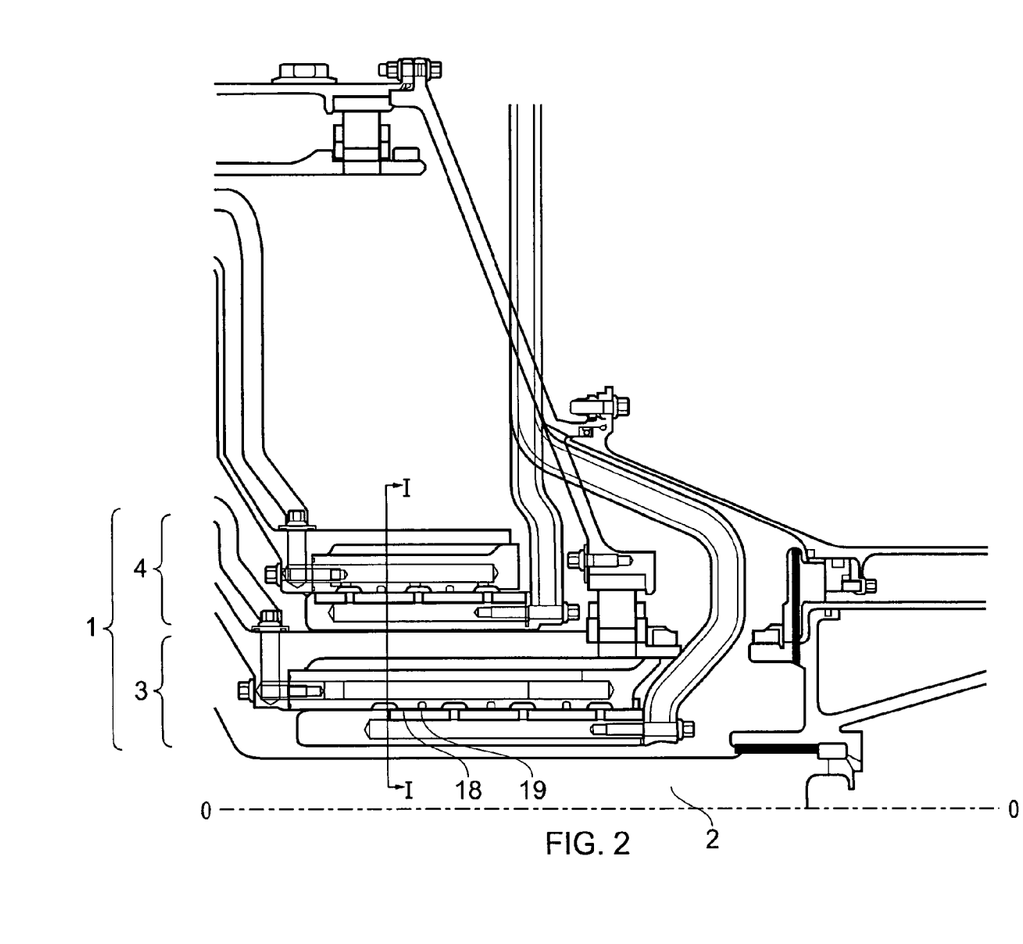
FIG. 2 shows a longitudinal cross-section through a hydraulic coupling for an in-line, contra-rotating, open rotor gas turbine engine.
Figure 3:
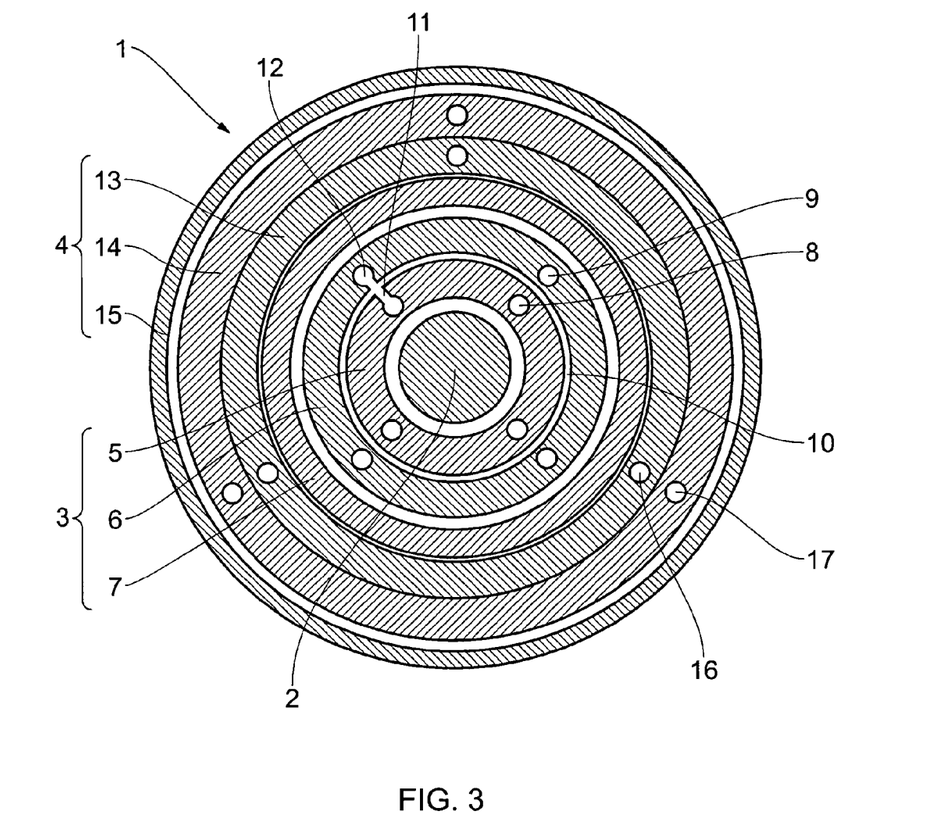
FIG. 3 shows schematically a transverse cross-section along plane I-I through the coupling of FIG. 2.

FIG. 2 shows a longitudinal cross-section through a hydraulic coupling 1 for an engine, such as the one shown in FIG. 1, and FIG. 3 shows schematically a transverse cross-section along plane I-I through the coupling. The engine centre line is indicated O-O in FIG. 2.

The coupling 1 is positioned between the engine power plant (ie the core engine 101) which is in the static frame, and an epicyclic gearbox 127 which has output drives for rotating the two contra-rotating propeller assemblies 125, 126. The drive shaft 2 extending forward from the free power turbine 118 is axially aligned with and penetrates through the centre of the coupling 1 to drive the sun gear of the gearbox 127.

The coupling 1 has an inner part 3 that transfers hydraulic fluid between the static frame and the forward propeller assembly 125, and an outer part 4 that transfers hydraulic fluid between the static frame and the aft propeller assembly 126. To reduce the length of the drive shaft 2 (which in turn reduces the weight and torsional flexibility of the shaft), the inner and outer parts of the coupling are radially stacked.

From its radially inner side to its radially outer side, the inner part 3 of the coupling 1 comprises a coaxial arrangement of an inner static feed cylinder 5, a forward rotor receptor cylinder 6, and a forward rotor mounting shaft 7. The forward rotor mounting shaft carries the forward rotor receptor cylinder and is driven by a planetary gear output drive from the gearbox 127, which output drive also rotates the forward propeller assembly 125. The inner static feed cylinder carries four static fluid passages 8 which extend axially through the cylinder. The forward rotor receptor cylinder carries four rotating fluid passages 9 which extend axially through the receptor cylinder. Each pair of a static fluid passage 8 and a rotating fluid passage 9 are fluidly coupled by a feed groove 10, a static-side port 11 which opens between the feed groove and the static fluid passage of the pair, and a rotating-side port 12 which opens between the feed groove and the rotating fluid passage of the pair. Only one feed groove and corresponding ports are shown in FIG. 3, the other feed groove and ports being axially spaced along the coupling. The feed grooves have arrangements to minimise or reduce fluid leaking in the axial direction of the coupling along the rotary interface between the static feed cylinder and the forward rotor receptor. This is by minimal plain bearing gaps 18 bounding each feed groove, with drain grooves 19 to allow leakage to drain into a main bearing and gearbox drain flow. This arrangement prevents leakage from one feed groove entering another feed groove.

From its radially inner side to its radially outer side, the outer part 4 of the coupling 1 comprises a coaxial arrangement of an outer static feed cylinder 13, an aft rotor receptor cylinder 14, and an aft rotor mounting shaft 15. The aft rotor mounting shaft carries the aft rotor receptor cylinder and is driven by a ring gear output drive from the gearbox 127, the ring gear output drive also contra-rotating the aft propeller assembly 126. The outer static feed cylinder carries three static fluid passages 16 which extend axially through the cylinder. The aft rotor receptor cylinder carries three rotating fluid passages 17 which extend axially through the receptor cylinder. Again, each pair of a static fluid passage 16 and a rotating fluid passage 17 are fluidly coupled by a feed groove and side port arrangement.

The degree of difficulty in providing a properly functioning and acceptable leakage rate hydraulic transfer coupling is typically measured by the parameter "PV", or feed pressure P times interface tangential velocity V. The latter is a function of radius. Thus, typically, the larger the fluid pressure, the higher the rotational speed, and the larger the radius, the more severe becomes the transfer pressure loss, the drag, the heat input to the hydraulic fluid, and the amount of port to port, or port to external, leakage.

Thus, as a consequence of the desire to minimise the PV of both the inner 3 and outer 4 parts of the coupling 1, in the arrangement of FIG. 2, the drive shaft 2 is solid so that the radius of the shaft can be kept to a minimum. This is less mechanically efficient than a hollow shaft would be, but a hollow shaft would increase the radius of the shaft, and unacceptably increase the PV of particularly the outer part of the coupling.

An object of the present invention is to provide a radially stacked hydraulic fluid transfer coupling which has lower PV across the radially outer rotary interface of the coupling. Accordingly, a first aspect of the invention provides a hydraulic fluid transfer coupling having a stator, a first coaxial rotor rotatable about the stator, and a second coaxial rotor rotatable about the stator, the first rotor being radially inwards of the stator, the second rotor being radially outwards of the stator, at least part of the first rotor axially overlapping with the stator across a first rotary interface, and at least part of the second rotor axially overlapping with the stator across a second rotary interface;

wherein the first rotor carries one or more first rotating fluid lines, the second rotor carries one or more second rotating fluid lines, and the stator carries one or more first static fluid lines corresponding to the first rotating fluid lines and one or more second static fluid lines corresponding to the second rotating fluid lines, each pair of a first rotating fluid line and the corresponding first static fluid line being fluidly coupled across the first rotary interface and each pair of a second rotating fluid line and the corresponding second static fluid line being fluidly coupled across the second rotary interface, whereby hydraulic fluid is transferable between each static fluid line and the corresponding rotating fluid line.

Thus, in the hydraulic fluid transfer coupling of this aspect of the invention, the stator is radially sandwiched between the two rotors and carries the static fluid lines for transferring to both sets of rotating fluid lines. Although this arrangement may result in a higher PV across the radially inner (first) rotary interface of the coupling compared to the PV of the inner part 3 of the coupling 1 of FIGS. 2 and 3, it allows the typically more critical PV across the radially outer (second) rotary interface to be reduced relative to the PV of the outer part 4 of the coupling of FIGS. 2 and 3. This reduction can be achieved because the coupling of this aspect of the invention does not require two stators, whereas the coupling of FIGS. 2 and 3 has an inner static feed cylinder 5 and an outer static feed cylinder 13 which both occupy radial space.

The coupling of this aspect of the invention may have any or, to the extent that they are compatible, any combination of the following optional features.

Typically, the static fluid lines comprise respective passages which extend axially through the stator. Alternatively or additionally, the rotating fluid lines typically comprise respective passages which extend axially through the respective rotor.

Conveniently, the coupling between each pair of a rotating fluid line and the corresponding static fluid line comprises a feed groove which extends circumferentially around the respective rotary interface, a static-side port which opens between the feed groove and the static fluid line of the pair, and a rotating-side port which opens between the feed groove and the rotating fluid line of the pair.

Conveniently, the first static fluid lines are grouped at one side of the stator, and the second static fluid lines are grouped at another side of the stator. This facilitates identification and subsequent routing of the lines.

Preferably, the first rotating fluid lines are equidistantly circumferentially spaced around the first rotor. Alternatively or additionally, the second rotating fluid lines are preferably equidistantly circumferentially spaced around the second rotor. Equidistant circumferential spacing of the lines helps to balance the rotors.

A second aspect of the invention provides an engine arrangement having:
  a power drive shaft,
  a gear assembly that is driven by the power drive shaft and provides a first output drive and a second output drive, and
  the hydraulic fluid transfer coupling of the first aspect, the power drive shaft being coaxial with the hydraulic fluid transfer coupling and penetrating the first rotor, the first output drive rotating the first rotor, and the second output drive rotating the second rotor;
  wherein the static fluid lines extend from a hydraulic pressure power source located on a static structure of the engine arrangement, the one or more first rotating fluid lines extend to one or more first hydraulic components (such as hydraulic actuators, bearing feeds and/or gearbox oil feeds) located on a first rotating structure rotating with the first rotor, and the one or more second rotating fluid lines extend to one or more second hydraulic components (such as hydraulic actuators, bearing feeds and/or gearbox oil feeds) located on a second rotating structure rotating with the second rotor.

Preferably, the power drive shaft is hollow. By reducing the PV value of the outer rotary interface for a given coupling inside diameter, it can be possible to increase the outside diameter of the penetrating drive shaft to an extent that a hollow shaft becomes feasible. This can lead to a significant reduction in the local shaft weight, tradable against a small increase in the hydraulic transfer coupling PV, size and weight.

Alternatively, however, the power drive shaft can be solid.

Typically, the second output drive contra-rotates relative to the first output drive.

Preferably, the gear assembly is an epicyclic gear assembly having a sun gear that is driven by the power drive shaft, planetary gears driven by the sun gear and in turn driving a carrier, and a ring gear driven by the planetary gears, the carrier providing the first output drive and the ring gear providing the second output drive.

The engine arrangement may further have:
  a first propeller assembly which provides the first rotating structure and is rotated by the first output drive, wherein the first rotor, the one or more first rotating fluid lines and the first hydraulic components rotate with the first propeller assembly, and
  a second propeller assembly which provides the second rotating structure and is rotated by second output drive, wherein the second rotor, the one or more second rotating fluid lines and the second hydraulic components rotate with the second propeller assembly.

A further aspect of the invention provides a gas turbine engine having an engine arrangement according to the second aspect, the engine driving the power drive shaft. When the engine arrangement has the first and second propeller assemblies, preferably these are axially aligned with and forward of the engine. The gas turbine engine can be a contra-rotating, open rotor engine, eg having a tractor configuration.

A further aspect of the invention provides a method of operating a gas turbine engine comprising a static structure having a hydraulic pressure power source located thereon, a contra-rotating structure having first and second hydraulic actuators located on respective contra-rotating parts thereof, and a hydraulic fluid transfer coupling according to the first aspect, the method comprising the step of transferring hydraulic fluid between the hydraulic pressure power source and the first and second hydraulic actuators. The first and second hydraulic actuators can vary the pitch of respective propellers of the first and second rotating structures. The engine can be a contra-rotating, open rotor, gas turbine engine, eg having a tractor configuration.

A further aspect of the invention provides a method of operating a gas turbine engine comprising a static structure having a source of lubricating fluid located thereon, a contra-rotating structure having one or more bearing lubrication feeds located thereon, and a hydraulic fluid transfer coupling according to the first aspect, the method comprising the step of transferring lubricating fluid between the source of lubricating fluid and the one or more bearing lubrication feeds. The gas turbine engine may further comprise a gearbox for driving the contra-rotating structure, and one or more gearbox lubrication feeds, and the method may further comprise the step of transferring lubricating fluid between the source of lubricating fluid and the one or more gearbox lubrication feeds. The engine can be a contra-rotating, open rotor, gas turbine engine, eg having a tractor configuration.

A further aspect of the invention provides a method of operating a gas turbine engine comprising a static structure having a source of lubricating fluid located thereon, a gearbox for driving a contra-rotating structure of the engine, one or more gearbox lubrication feeds, and a hydraulic fluid transfer coupling according to the first aspect, the method comprising the step of transferring lubricating fluid between the source of lubricating fluid and the one or more gearbox lubrication feeds. The engine can be a contra-rotating, open rotor, gas turbine engine, eg having a tractor configuration.

Embodiments of the invention will now be described by way of example with reference to the accompanying drawings in which.

Figure 4:
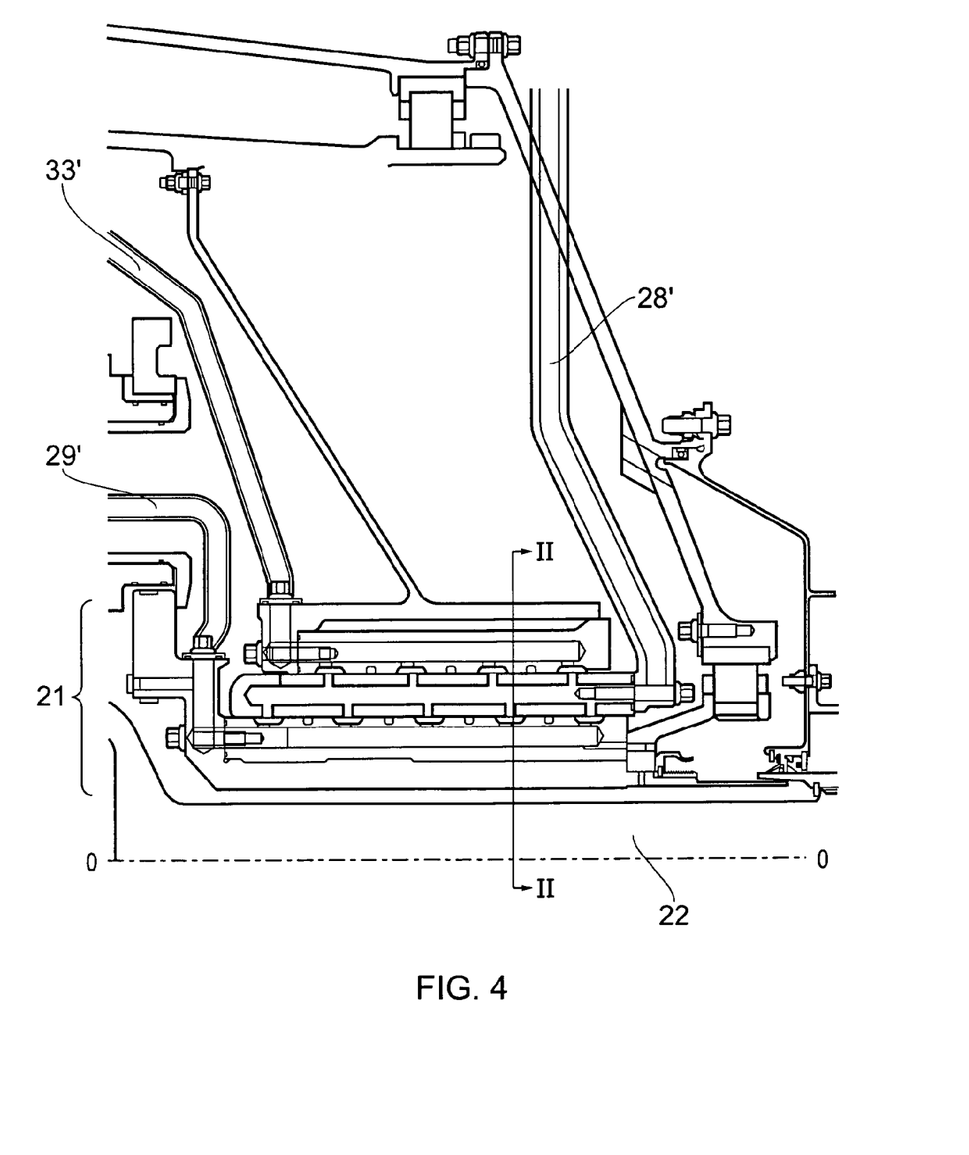
FIG. 4 shows a longitudinal cross-section through a hydraulic coupling according to the present invention for an in-line, contra-rotating, open rotor gas turbine engine.
Figure 5:
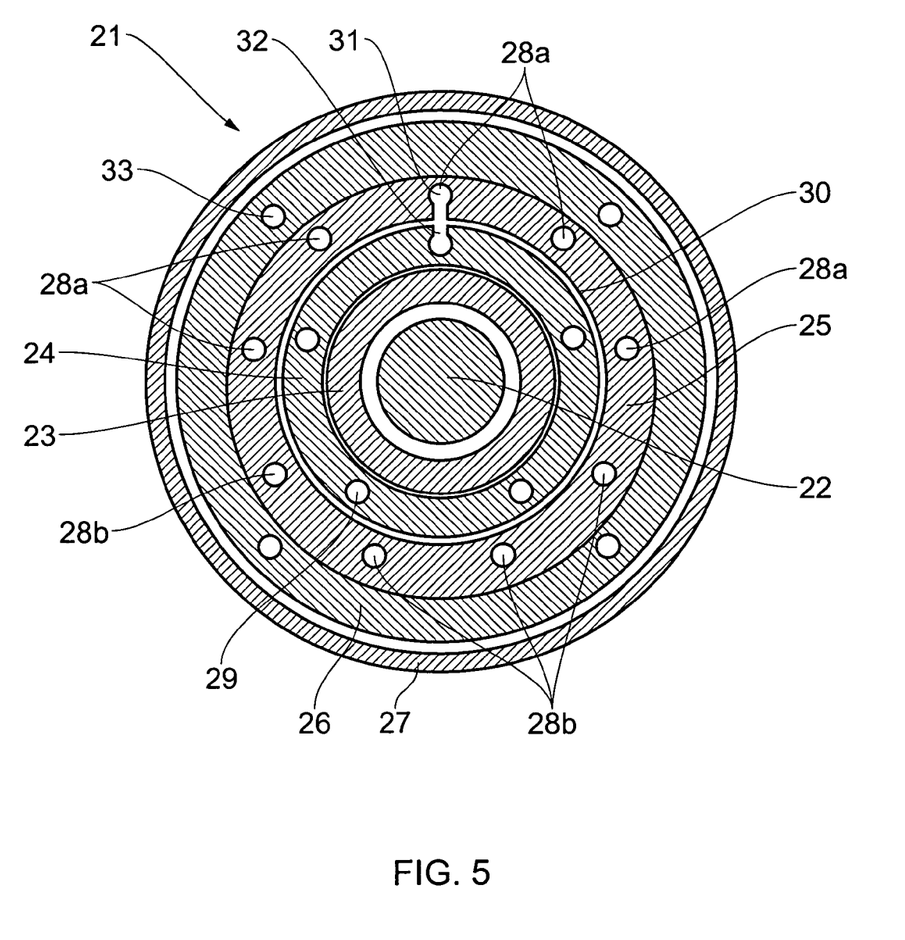
FIG. 5 shows schematically a transverse cross-section along plane II-II through the coupling of FIG. 4.

FIG. 4 shows a longitudinal cross-section through a hydraulic coupling 21 for an in-line, contra-rotating, open rotor gas turbine engine. The coupling transfers hydraulic fluid (eg oil) between a pump mounted to the static structure of the engine and components (such as pitch change actuators) which rotate with the propeller assemblies of the engine. FIG. 5 shows schematically a transverse cross-section along plane II-II through the coupling. The engine centre line is indicated O-O in FIG. 4.

The coupling 21 is positioned between the engine power plant to the right which is in the static frame, and an epicyclic gearbox to the left which has output drives for rotating the two contra-rotating propeller assemblies. A drive shaft 22 from the power plant is axially aligned with and penetrates through the centre of the coupling 21 to reach a sun gear of the gearbox.

From its radially inner side to its radially outer side, the coupling 21 comprises a coaxial arrangement of a forward rotor mounting shaft 23, a forward rotor receptor cylinder 24, a static feed cylinder 25, an aft rotor receptor cylinder 26, and an aft rotor mounting shaft 27. The forward rotor mounting shaft carries the forward rotor receptor cylinder and is rotated by a planetary gear carrier of the gearbox, which carrier also rotates the forward propeller assembly. The aft rotor mounting shaft carries the aft rotor receptor cylinder and is contra-rotated by a ring gear of the gearbox, the ring gear also contra-rotating the aft propeller assembly.

The static feed cylinder 25 is shown in this typical example as carrying nine static fluid passages 28a, b, which extend axially through the cylinder, but other numbers are possible. Typically, five of the static fluid passages 28a are matched with five rotating fluid passages 29 which extend axially through the forward rotor receptor cylinder 24. Each pair of a static fluid passage 28a and a rotating fluid passage 29 are fluidly coupled by a feed groove 30, a static-side port 31 which opens between the feed groove and the static fluid passage of the pair, and a rotating-side port 32 which opens between the feed groove and the rotating fluid passage of the pair. Only one feed groove and corresponding ports are shown in FIG. 5, the other feed groove and ports being axially spaced along the coupling.

Typically, the other four of the static fluid passages 28b are matched with four rotating fluid passages 33 which extend axially through the aft rotor receptor cylinder 26. Again, each pair of a static fluid passage 28b and a rotating fluid passage 33 are fluidly coupled by a feed groove and side port arrangement.

To balance the forward 24 and aft 26 rotor receptor cylinders, the respective rotating fluid passages 29, 33 are typically equidistantly circumferentially spaced around the cylinders. For convenience the five static fluid passages 28a may be grouped at one side of the static feed cylinder 25 while the other four static fluid passages 28b may be grouped at the other side of the cylinder.

On the right hand side of FIG. 4 the static fluid passages 28a, b are shown extending as a bundle of corresponding fluid lines 28' towards the hydraulic fluid pump. On the left hand side of FIG. 4 each rotating fluid passage 29 is shown extending as corresponding fluid line 29' towards the forward propeller assembly, and each rotating fluid passage 33 is shown extending as a corresponding fluid line 33' towards the aft propeller assembly.

Advantageously, by combining two static feed cylinders into the single static feed cylinder 25, with inner and outer surfaces of the feed cylinder both active in respective rotary interfaces, a lighter, cheaper, simpler coupling 21 may be obtained. In particular, the coupling has a reduced part count and a reduced PV value for the outer rotary interface. For example, for the same coupling inside diameter, it is estimated that about a 22% reduction in PV value can be obtained for the outer rotary interface of the coupling 21 relative to the coupling 1 of FIGS. 2 and 3. Also, in the coupling 21, the PV values for the two rotary interfaces are more closely matched than those of the coupling 1 of FIGS. 2 and 3.

Although not shown in FIGS. 4 and 5, the reduced PV value for the outer rotary interface of the coupling 21 may allow the outside diameter of the coupling to be increased to an extent that permits a hollow drive shaft to be used in place of the solid drive shaft 22. This could produce significant weight saving in the local shaft weight, tradable against a small increase in the hydraulic transfer coupling PV, size and weight.

A further reduction in coupling radius could be obtained by integrating the forward rotor mounting shaft 23 and the forward rotor receptor cylinder 24 as a single component.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A hydraulic fluid transfer coupling having a stator, a first coaxial rotor rotatable about the stator, and a second coaxial rotor rotatable about the stator, the first rotor being radially inwards of the stator, the second rotor being radially outwards of the stator, at least part of the first rotor axially overlapping with the stator across a first rotary interface, and at least part of the second rotor axially overlapping with the stator across a second rotary interface;
   wherein the first rotor carries one or more first rotating fluid lines, the second rotor carries one or more second rotating fluid lines, and the stator carries one or more first static fluid lines corresponding to the first rotating fluid lines and one or more second static fluid lines corresponding to the second rotating fluid lines, each pair of a first rotating fluid line and the corresponding first static fluid line being fluidly coupled across the first rotary interface and each pair of a second rotating fluid line and the corresponding second static fluid line being fluidly coupled across the second rotary interface, whereby hydraulic fluid is transferable between each static fluid line and the corresponding rotating fluid line, and
   wherein the first static fluid lines are grouped at one side of the stator, and the second static fluid lines are grouped at another side of the stator.

2. A hydraulic fluid transfer coupling according to claim 1, wherein the static fluid lines comprise respective passages which extend axially through the stator.

3. A hydraulic fluid transfer coupling according to claim 1, wherein the rotating fluid lines comprise respective passages which extend axially through the respective rotor.

4. A hydraulic fluid transfer coupling according to claim 1, wherein the coupling between each pair of a rotating fluid line and the corresponding static fluid line comprises a feed groove which extends circumferentially around the respective rotary interface, a static-side port which opens between the feed groove and the static fluid line of the pair, and a rotating-side port which opens between the feed groove and the rotating fluid line of the pair.

5. A hydraulic fluid transfer coupling according to claim 1, wherein the first rotating fluid lines are equidistantly circumferentially spaced around the first rotor.

6. A hydraulic fluid transfer coupling according to claim 1, wherein the second rotating fluid lines are equidistantly circumferentially spaced around the second rotor.

7. An engine arrangement having:
   a power drive shaft,
   a gear assembly that is driven by the power drive shaft and provides a first output drive and a second output drive, and
   the hydraulic fluid transfer coupling of any one of the previous claims, the power drive shaft being coaxial with the hydraulic fluid transfer coupling and penetrating the first rotor, the first output drive rotating the first rotor, and the second output drive rotating the second rotor;
   wherein the static fluid lines extend from a hydraulic pressure power source located on a static structure of the engine arrangement, the one or more first rotating fluid lines extend to one or more first hydraulic components located on a first rotating structure rotating with the first rotor, and the one or more second rotating fluid lines extend to one or more second hydraulic components located on a second rotating structure rotating with the second rotor.

8. An engine arrangement according to claim 7, wherein the power drive shaft is hollow.

9. An engine arrangement according to claim 7, wherein the second output drive contra-rotates relative to the first output drive.

10. An engine arrangement according to claim 7, wherein the gear assembly is an epicyclic gear assembly having a sun gear that is driven by the power drive shaft, planetary gears driven by the sun gear and in turn driving a carrier, and a ring gear driven by the planetary gears, the carrier providing the first output drive and the ring gear providing the second output drive.

11. An engine arrangement according to claim 7, further having:
   a first propeller assembly which provides the first rotating structure and is rotated by the first output drive, wherein the first rotor, the one or more first rotating fluid lines and the first hydraulic components rotate with the first propeller assembly, and
   a second propeller assembly which provides the second rotating structure and is rotated by second output drive, wherein the second rotor, the one or more second rotating fluid lines and the second hydraulic components rotate with the second propeller assembly.

12. A gas turbine engine having an engine arrangement according to claim 7, the engine driving the power drive shaft.

13. A gas turbine engine according to claim 12 having a first propeller assembly which provides the first rotating structure and is rotated by the first output drive, wherein the first rotor, the one or more first rotating fluid lines and the first hydraulic components rotate with the first propeller assembly, and
   a second propeller assembly which provides the second rotating structure and is rotated by second output drive, wherein the second rotor, the one or more second rotating fluid lines and the second hydraulic components rotate with the second propeller assembly,
   wherein the propeller assemblies are axially aligned with and forward of the engine.

14. A method of operating a gas turbine engine comprising a static structure having a hydraulic pressure power source located thereon, a contra-rotating structure having first and second hydraulic actuators located on respective contra-rotating parts thereof, and a hydraulic fluid transfer coupling according to claim 1, the method comprising the step of transferring hydraulic fluid between the hydraulic pressure power source and the first and second hydraulic actuators.

15. A method of operating a gas turbine engine comprising a static structure having a source of lubricating fluid located thereon, a contra-rotating structure having one or more bearing lubrication feeds located thereon, and a hydraulic fluid transfer coupling according to claim 1, the method comprising the step of transferring lubricating fluid between the source of lubricating fluid and the one or more bearing lubrication feeds.

16. A method of operating a gas turbine engine comprising a static structure having a source of lubricating fluid located thereon, a gearbox for driving a contra-rotating structure of the engine, one or more gearbox lubrication feeds, and a hydraulic fluid transfer coupling according to claim 1, the method comprising the step of transferring lubricating fluid between the source of lubricating fluid and the one or more gearbox lubrication feeds.

* * * * *